(12) United States Patent
Pope et al.

(10) Patent No.: US 9,690,724 B2
(45) Date of Patent: *Jun. 27, 2017

(54) DUAL-DRIVER INTERFACE

(71) Applicant: Solarflare Communications, Inc., Irvine, CA (US)

(72) Inventors: Steve Leslie Pope, Costa Mesa, CA (US); David James Riddoch, Fenstanton (GB)

(73) Assignee: SolarFlare Communications, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/489,417

(22) Filed: Sep. 17, 2014

(65) Prior Publication Data
US 2015/0006772 A1    Jan. 1, 2015

Related U.S. Application Data

(63) Continuation of application No. 11/514,764, filed on Aug. 31, 2006, now Pat. No. 8,855,137, which is a
(Continued)

(51) Int. Cl.
*G06F 13/24* (2006.01)
*G06F 13/42* (2006.01)
*G06F 13/38* (2006.01)

(52) U.S. Cl.
CPC ............ *G06F 13/24* (2013.01); *G06F 13/385* (2013.01); *G06F 13/4282* (2013.01)

(58) Field of Classification Search
CPC ..... G06F 13/24; G06F 13/4282; G06F 13/385
(Continued)

(56) References Cited

U.S. PATENT DOCUMENTS 5,272,599 A    12/1993   Koenen
5,325,532 A     6/1994   Crosswy et al.
(Continued)

FOREIGN PATENT DOCUMENTS

EP    620521     3/1995
EP    2272214    1/2011
(Continued)

OTHER PUBLICATIONS

The Design and Evaluation of an Off-Host Communications Protocol Architecture, MSci Thesis, University of Virginia, Jeffrey R. Michel, Aug. 1993.
(Continued)

*Primary Examiner* — Gbemileke J Onamuti
(74) *Attorney, Agent, or Firm* — Weide & Miller, Ltd.

(57) ABSTRACT

A network interface device capable of communication with a data processing system supporting an operating system and at least one application, the network interface device supporting communication with the operating system by means of: two or more data channels, each data channel being individually addressable by the network interface device and being capable of carrying application-level data between the network interface device and the data processing device; and a control channel individually addressable by the network interface device and capable of carrying control data between the network interface device, the control data defining commands and the network interface being responsive to at least one command sent over the control channel to establish at least one additional data channel.

17 Claims, 5 Drawing Sheets

Related U.S. Application Data continuation of application No. PCT/GB2005/000820, filed on Mar. 2, 2005.

(58) Field of Classification Search
USPC .......................... 370/463; 719/313; 726/17
See application file for complete search history.

(56) References Cited

U.S. PATENT DOCUMENTS

| | | | |
|---|---|---|---|
| 5,636,188 A * | 6/1997 | Funahashi | 711/4 |
| 5,946,189 A | 8/1999 | Koenen et al. | |
| 5,996,031 A * | 11/1999 | Lim | G06F 13/385 |
| | | | 710/20 |
| 6,098,112 A | 8/2000 | Ishijima et al. | |
| 6,160,554 A | 12/2000 | Krause | |
| 6,304,945 B1 | 10/2001 | Koenen | |
| 6,308,282 B1 * | 10/2001 | Huang et al. | 714/4.3 |
| 6,349,035 B1 | 2/2002 | Koenen | |
| 6,438,130 B1 | 8/2002 | Kagan et al. | |
| 6,502,203 B2 | 12/2002 | Barron et al. | |
| 6,530,007 B2 | 3/2003 | Olarig et al. | |
| 6,667,918 B2 | 12/2003 | Leader et al. | |
| 6,718,392 B1 | 4/2004 | Krause | |
| 6,725,311 B1 | 4/2004 | Joy et al. | |
| 6,728,743 B2 | 4/2004 | Shachar | |
| 6,735,642 B2 | 5/2004 | Kagan et al. | |
| 6,760,783 B1 * | 7/2004 | Berry | G06F 9/4812 |
| | | | 710/260 |
| 6,768,996 B1 | 7/2004 | Steffens et al. | |
| 6,904,534 B2 | 6/2005 | Koenen | |
| 6,950,961 B2 | 9/2005 | Krause et al. | |
| 6,978,331 B1 | 12/2005 | Kagan et al. | |
| 7,089,335 B2 | 8/2006 | Aiken et al. | |
| 7,093,158 B2 | 8/2006 | Barron et al. | |
| 7,099,275 B2 | 8/2006 | Sarkinen et al. | |
| 7,103,626 B1 | 9/2006 | Recio et al. | |
| 7,103,744 B2 | 9/2006 | Garcia et al. | |
| 7,103,888 B1 * | 9/2006 | Cayton et al. | 719/313 |
| 7,136,397 B2 | 11/2006 | Sharma | |
| 7,143,412 B2 | 11/2006 | Koenen | |
| 7,149,227 B2 | 12/2006 | Stoler et al. | |
| 7,151,744 B2 | 12/2006 | Sarkinen et al. | |
| 7,216,225 B2 | 5/2007 | Haviv et al. | |
| 7,240,350 B1 | 7/2007 | Eberhard et al. | |
| 7,245,627 B2 | 7/2007 | Goldenberg et al. | |
| 7,254,237 B1 | 8/2007 | Jacobson et al. | |
| 7,285,996 B2 | 10/2007 | Fiedler | |
| 7,287,273 B2 * | 10/2007 | Shoji et al. | 726/7 |
| 7,316,017 B1 | 1/2008 | Jacobson et al. | |
| 7,346,702 B2 | 3/2008 | Haviv | |
| 7,386,619 B1 | 6/2008 | Jacobson et al. | |
| 7,403,535 B2 | 7/2008 | Modi et al. | |
| 7,404,190 B2 | 7/2008 | Krause et al. | |
| 7,502,826 B2 | 3/2009 | Barron et al. | |
| 7,509,355 B2 | 3/2009 | Hanes et al. | |
| 7,518,164 B2 | 4/2009 | Smelloy et al. | |
| 7,551,614 B2 | 6/2009 | Teisberg et al. | |
| 7,554,993 B2 | 6/2009 | Modi et al. | |
| 7,573,967 B2 | 8/2009 | Fiedler | |
| 7,580,415 B2 | 8/2009 | Hudson et al. | |
| 7,580,495 B2 | 8/2009 | Fiedler | |
| 7,617,376 B2 | 11/2009 | Chadalapaka et al. | |
| 7,631,106 B2 | 12/2009 | Goldenberg et al. | |
| 7,650,386 B2 | 1/2010 | McMahan et al. | |
| 7,688,853 B2 | 3/2010 | Santiago et al. | |
| 7,757,232 B2 | 7/2010 | Hilland et al. | |
| 7,801,027 B2 | 9/2010 | Kagan et al. | |
| 7,802,071 B2 | 9/2010 | Oved | |
| 7,813,460 B2 | 10/2010 | Fiedler | |
| 7,822,837 B1 * | 10/2010 | Urban et al. | 709/223 |
| 7,827,442 B2 | 11/2010 | Sharma et al. | |
| 7,835,375 B2 | 11/2010 | Sarkinen et al. | |
| 7,848,322 B2 | 12/2010 | Oved | |
| 7,856,488 B2 | 12/2010 | Cripe et al. | |
| 7,864,787 B2 | 1/2011 | Oved | |
| 7,904,576 B2 | 3/2011 | Krause et al. | |
| 7,921,178 B2 | 4/2011 | Haviv | |
| 7,929,539 B2 | 4/2011 | Kagan et al. | |
| 7,934,959 B2 | 5/2011 | Rephaeli et al. | |
| 7,978,606 B2 | 7/2011 | Buskirk et al. | |
| 8,000,336 B2 | 8/2011 | Harel | |
| 8,855,137 B2 * | 10/2014 | Pope et al. | 370/463 |
| 2002/0059052 A1 | 5/2002 | Bloch et al. | |
| 2002/0112139 A1 | 8/2002 | Krause et al. | |
| 2002/0129293 A1 | 9/2002 | Hutton et al. | |
| 2002/0140985 A1 | 10/2002 | Hudson | |
| 2002/0156784 A1 | 10/2002 | Hanes et al. | |
| 2003/0007165 A1 | 1/2003 | Hudson | |
| 2003/0058459 A1 | 3/2003 | Wu et al. | |
| 2003/0063299 A1 | 4/2003 | Cowan et al. | |
| 2003/0065856 A1 | 4/2003 | Kagan et al. | |
| 2003/0081060 A1 | 5/2003 | Zeng et al. | |
| 2003/0140268 A1 * | 7/2003 | Mahoney | 714/4 |
| 2003/0172330 A1 | 9/2003 | Barron et al. | |
| 2003/0187914 A1 | 10/2003 | Kaniyar et al. | |
| 2003/0191786 A1 | 10/2003 | Matson et al. | |
| 2003/0202043 A1 | 10/2003 | Zeng et al. | |
| 2003/0214677 A1 | 11/2003 | Bhaskar et al. | |
| 2004/0071250 A1 | 4/2004 | Bunton et al. | |
| 2004/0141642 A1 | 7/2004 | Zeng et al. | |
| 2004/0190533 A1 | 9/2004 | Modi et al. | |
| 2004/0190538 A1 | 9/2004 | Bunton et al. | |
| 2004/0190557 A1 | 9/2004 | Barron | |
| 2004/0193734 A1 | 9/2004 | Barron et al. | |
| 2004/0193825 A1 | 9/2004 | Garcia et al. | |
| 2004/0210754 A1 | 10/2004 | Barron et al. | |
| 2004/0252685 A1 | 12/2004 | Kagan et al. | |
| 2005/0008223 A1 | 1/2005 | Zeng et al. | |
| 2005/0018221 A1 | 1/2005 | Zeng et al. | |
| 2005/0038918 A1 | 2/2005 | Hilland et al. | |
| 2005/0038941 A1 | 2/2005 | Chadalapaka et al. | |
| 2005/0039171 A1 | 2/2005 | Avakian et al. | |
| 2005/0039172 A1 | 2/2005 | Rees et al. | |
| 2005/0039187 A1 | 2/2005 | Avakian et al. | |
| 2005/0066333 A1 | 3/2005 | Krause et al. | |
| 2005/0172181 A1 | 8/2005 | Huliehel | |
| 2005/0219278 A1 | 10/2005 | Hudson | |
| 2005/0219314 A1 | 10/2005 | Donovan et al. | |
| 2005/0231751 A1 | 10/2005 | Wu et al. | |
| 2006/0026443 A1 | 2/2006 | McMahan et al. | |
| 2006/0045098 A1 | 3/2006 | Krause | |
| 2006/0126619 A1 | 6/2006 | Teisberg et al. | |
| 2006/0165074 A1 | 7/2006 | Modi et al. | |
| 2006/0193318 A1 | 8/2006 | Narasimhan et al. | |
| 2006/0228637 A1 | 10/2006 | Jackson et al. | |
| 2006/0248191 A1 | 11/2006 | Hudson et al. | |
| 2007/0188351 A1 | 8/2007 | Brown et al. | |
| 2007/0220183 A1 | 9/2007 | Kagan et al. | |
| 2008/0024586 A1 | 1/2008 | Barron | |
| 2008/0109526 A1 | 5/2008 | Subramanian et al. | |
| 2008/0115216 A1 | 5/2008 | Barron et al. | |
| 2008/0115217 A1 | 5/2008 | Barron et al. | |
| 2008/0126509 A1 | 5/2008 | Subramanian et al. | |
| 2008/0135774 A1 | 6/2008 | Hugers | |
| 2008/0147828 A1 | 6/2008 | Enstone et al. | |
| 2008/0148400 A1 | 6/2008 | Barron et al. | |
| 2008/0177890 A1 | 7/2008 | Krause et al. | |
| 2008/0244060 A1 | 10/2008 | Cripe et al. | |
| 2008/0301406 A1 | 12/2008 | Jacobson et al. | |
| 2008/0304519 A1 | 12/2008 | Koenen et al. | |
| 2009/0165003 A1 | 6/2009 | Jacobson et al. | |
| 2009/0201926 A1 | 8/2009 | Kagan et al. | |
| 2009/0213856 A1 | 8/2009 | Paatela et al. | |
| 2009/0268612 A1 | 10/2009 | Felderman et al. | |
| 2009/0302923 A1 | 12/2009 | Smeloy et al. | |
| 2010/0088437 A1 | 4/2010 | Zahavi | |
| 2010/0138840 A1 | 6/2010 | Kagan et al. | |
| 2010/0169880 A1 | 7/2010 | Haviv et al. | |
| 2010/0188140 A1 | 7/2010 | Smelloy | |
| 2010/0189206 A1 | 7/2010 | Kagan | |
| 2010/0265849 A1 | 10/2010 | Harel | |
| 2010/0274876 A1 | 10/2010 | Kagan et al. | |
| 2011/0004457 A1 | 1/2011 | Haviv et al. | |
| 2011/0010557 A1 | 1/2011 | Kagan et al. | |

(56) References Cited

U.S. PATENT DOCUMENTS

| | | |
|---|---|---|
| 2011/0029669 A1 | 2/2011 | Chuang et al. |
| 2011/0029847 A1 | 2/2011 | Goldenberg et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0173352 A1 | 7/2011 | Sela et al. |

FOREIGN PATENT DOCUMENTS

| | | |
|---|---|---|
| WO | 0148972 | 7/2001 |
| WO | 0235838 | 5/2002 |
| WO | 03069492 | 2/2003 |
| WO | 2008127672 | 12/2008 |
| WO | 2009136933 | 11/2009 |
| WO | 2010020907 | 7/2010 |
| WO | 2010087826 | 8/2010 |
| WO | 2011043768 | 4/2011 |
| WO | 2011053305 | 5/2011 |
| WO | 2011053330 | 5/2011 |

OTHER PUBLICATIONS

A Workstation Architecture to Support Multimedia, PhD Thesis, University of Cambridge, Mark David Hayter, Sep. 1993.

The Importance of Non-Data Touching Processing Overheads in TCP/IP, ACM Computer Communication Review, vol. 23, No. 4, pp. 259-268, Jonathan Kay and Joseph Pasquale, Oct. 1993.

On the Self-Similar Nature of Ethernet Traffic, ACM Computer Communication Review, vol. 23, No. 4, p. 85-95, W. E. Leland, et al., Oct. 1993.

Implementing Network Protocols at User Level, ACM Computer Communication Review, vol. 23, No. 4, C. A. Thekkath, et al., Oct. 1993.

A Programmable HIPPI Interface for a Graphics Supercomputer, Proceedings of the 1993 ACM/IEEE conference on Supercomputing, p. 452-461, Portland, Oregon, Raj K. Singh, et al., Nov. 15, 1993.

Fbufs: A High-Bandwidth Cross-Domain Transfer Facility, ACM Operating Systems Review, vol. 27, Issue 5, p. 189-202, Peter Druschel and Larry L. Peterson, Dec. 1993.

The Parallel Protocol Engine, IEEE/ACM Transactions on Networking, vol. 1, No. 6, p. 650-663, Matthias Kaiserswerth, Dec. 1993.

Protocol Service Decomposition for High-Performance Networking, ACM Operating Systems Review, vol. 27, Issue 5, p. 244-255, Chris Maeda, Brian Bershad, Dec. 1993.

ETA: Experience with an Intel Xeon Processor as a Packet Processing Engine, IEEE Micro, vol. 24, No. 1, p. 24-31, Greg Regnier, et al., Jan. 1994.

A Simple LAN Performance Measure, ACM Computer Communication Review, vol. 24, No. 1, pp. 7-11, J. Vis, Jan. 1994.

ATOMIC: A High-Speed Local Communication Architecture, Journal of High Speed Networks, Danny Cohen, Gregory Finn, Robert Felderman, and Annette DeSchon, Jan. 3, 1994.

Netstation Architecture Multi-Gigabit Workstation Network Fabric, Proceedings of InterOp '94, Las Vegas, Nevada, Gregory G. Finn and Paul Mockapetris, May 1994.

The Medusa Applications Environment, Proceedings of the International Conference on Multimedia Computing and Systems, p. 265-273, Boston, Stuart Wray, et al., May 1994.

MPI: A Message-Passing Interface Standard, Message-Passing Interface Forum, University of Tennessee, Knoxville, Various forum members, May 5, 1994.

A Programmable Network Interface for a Message-Based Multicomputer, ACM Computer Communication Review, vol. 24, No. 3, p. 8-17, Raj K. Singh, et al., Jul. 1994.

Experiences with a High-Speed Network Adaptor: A Software Perspective, ACM Computer Communication Review, vol. 24, No. 4, P. Druschel, et al., Oct. 1994.

TCP and Explicit Congestion Notification, ACM, ACM Computer Communication Review, vol. 24, No. 5, p. 8-23, Sally Floyd, Oct. 1994.

User-Space Protocols Deliver High Performance to Applications on a Low-Cost Gb/s LAN, ACM Computer Communication Review, vol. 24, No. 4, pp. 14-23, A. Edwards, et al., Oct. 1994.

TCP Vegas: New Techniques for Congestion Detection and Avoidance, ACM Computer Communication Review, vol. 24, No. 4, p. 24-35, L. S. Brakmo, et al., Oct. 1994.

The Dynamics of TCP Traffic over ATM Networks, ACM Computer Communication Review, vol. 24, No. 4, p. 79-88, A. Romanow and S. Floyd, Oct. 1994.

Experiences of Building an ATM Switch for the Local Area, ACM Computer Communication Review, vol. 24, No. 4, p. 158-167, R. J. Black, I. Leslie, and D. McAuley, Oct. 1994.

Application-Specific Protocols for User-Level Shared Memory, Proceedings of the 1994 conference on Supercomputing, pp. 380-389, Washington D.C., Babak Falsafi, et al., Nov. 14, 1994.

Performance of High-Speed Network I/O Subsystems: Case Study of a Fibre Channel Network, Proceedings of the 1994 conference on Supercomputing, Washington D.C., Mengjou Lin, et al., Nov. 14, 1994.

Myrinet: A Gigabit-per-Second Local-Area Network, Draft of paper published in IEEE Micro, vol. 15, No. 1, pp. 29-36, Nanette J. Boden, et al., Nov. 16, 1994.

Beowolf: A Parallel Workstation for Scientific Computation, Proceedings of the 24th International Conference on Parallel Processing, pp. 11-14, Thomas Sterling, et al., Aug. 1995.

Software Support for Outboard Buffering and Checksumming, ACM Computer Communication Review, vol. 25, No. 4, p. 87-98, K. Kleinpaste, P. Steenkiste, B. Zill,, Oct. 1995.

Performance of Checksums and CRCS over Real Data, ACM Computer Communication Review, vol. 25, No. 4, p. 68-76, C. Partridge, J. Hughes, and J. Stone, Oct. 1995.

Experiences Implementing a High-Performance TCP in User-Space, ACM Computer Communication Review, vol. 25, No. 4, A. Edward and S. Muir, Oct. 1995.

The Case for Persistent-Connection HTTP, ACM Computer Communication Review, vol. 25, No. 4, J. C. Mogul, Oct. 1995.

U-Net: A User-Level Network Interface for Parallel and Distributed Computing, ACM Operating Systems Review, vol. 29, Issue 5, p. 109-126, Thorsten von Eicken, et al., Dec. 1995.

Towards an Active Network Architecture, ACM Computer Communication Review, vol. 26, No. 2, pp. 15-20, D. L. Tennenhouse, and D. J. Wetherall, Apr. 1996.

Low-Latency Communication on the IBM RISC System/6000 SP, Gigabit Networking Workshop '97 Meeting, Kobe, Japan, Chi-Chao Chang, et al., Nov. 17, 1996.

Experiences with a Production Gigabit LAN, Gigabit Networking Workshop '97 Meeting, Kobe, Japan, Joe Touch, et al., Apr. 1997.

Host-based Routing Using Peer DMA, Gigabit Networking Workshop '97 Meeting, Kobe, Japan, Joe Touch, et al., Apr. 1997.

Report on the 5th IFIP Internation Workshop on Quality of Service (IWQOS 97), ACM Computer Communication Review, vol. 27, No. 3, pp. 100-117, O. Angin et al., Jul. 1997.

Firefly: a Multiprocessor Workstation, ACM Operating Systems Review, vol. 21, Issue 4, p. 164-172, Charles P. Thacker and Lawrence C. Stewart, Oct. 1997.

Performance Evaluation of the SGI Origin2000: A Memory-Centric Characterization of LANL ASCI Applications, Proceedings of the 1997 ACM/IEEE conference on Supercomputing, p. 1-11, San Jose, California, Harvey J. Wassermann, et al., Nov. 16, 1997.

An Implementation and Analysis of the Virtual Interface Architecture, Proceedings of the 1998 ACM/IEEE conference on Supercomputing, p. 1-15, Orlando, Florida, Philip Buonadonna, et al., Nov. 7, 1998.

MPI-StarT: Delivering Network Performance to Numerical Applications, Proceedings of the 1998 ACM/IEEE conference on Supercomputing, p. 1-15, Orlando, Florida, Parry Husbands and James C. Hoe, Nov. 7, 1998.

(56) References Cited

OTHER PUBLICATIONS

Avalon: An Alpha/Linux Cluster Achieves 10 Gflops for $150k, Proceedings of the 1998 ACM/IEEE conference on Supercomputing, Orlando, Florida, Michael S. Warren, et al., Nov. 7, 1998.
Scaling of Beowulf-class Distributed Systems, Proceedings of the 1998 ACM/IEEE conference on Supercomputing, Orlando, Florida, John Salmon, et al., Nov. 7, 1998.
StarT-Voyager: A Flexible Platform for Exploring Scalable SMP Issues, Proceedings of the 1998 ACM/IEEE conference on Supercomputing, Orlando, Florida, Boon S. Ang, et al., Nov. 7, 1998.
Enhancing Distributed Systems with Low-Latency Networking, Parallel and Distributed Computing and Networks, Brisbane, Australia, S. L. Pope, et al., Dec. 1998.
Internet Vulnerabilities Related to TCP/IP and T/TCP, ACM Computer Communication Review, vol. 29, No. 1, pp. 81-85, M. de Vivo, et al., Jan. 1999.
TCP Byte Counting Refinements, ACM Computer Communication Review, vol. 29, No. 3, M. Allman, Jul. 1999.
Piglet: A Low-Intrusion Vertical Operating System, Technical Report MS-CIS-00-04, University of Pennsylvania, Steve Muir and Jonathan Smith, Jan. 2000.
Characterizing Processor Architectures for Programmable Network Interfaces, Proceedings of the 14th international conference on Supercomputing, pp. 54-65, Santa Fe, New Mexico, Patrick Crowley, et al., May 8, 2000.
When the CRC and TCP Checksum Disagree, ACM Computer Communication Review, vol. 30, No. 4, pp. 309-319, Jonathan Stone and Craig Partridge, Oct. 2000.
The Failure of TCP in High-Performance Computational Grids, Proceedings of the 2000 ACM/IEEE conference on Supercomputing, Dallas, Texas, W. Feng and P. Tinnakornsrisuphap, Nov. 4, 2000.
Architectural and Performance Evaluation of GigaNet and Myrinet Interconnects on Clusters of Small-Scale SMP Servers, Proceedings of the 2000 ACM/IEEE conference on Supercomputing, Dallas, Texas, Jenwei Hsieh, et al., Nov. 4, 2000.
Arsenic: A User-Accessible Gigabit Ethernet Interface, Proceedings of IEEE Infocom 2001, pp. 67-76, Ian Pratt and Keir Fraser, Apr. 22, 2001.
Deferred Segmentation for Wire-Speed Transmission of Large TCP Frames over Standard GbE Networks, Proceedings of the 9th Symposium on High Performance Interconnects, pp. 81, Bilic Hrvoye, et al., Aug. 22, 2001.
Presentation given at HOTI'01, 9th Symposium on High Performance Interconnects, Bilic Hrvoye, et al., Aug. 22, 2001.
Topology Discovery for Large Ethernet Networks, ACM Computer Communication Review, vol. 31, No. 4, Bruce Lowekamp, et al., Oct. 2001.
EMP: Zero-copy OS-bypass NIC-driven Gigabit Ethernet Message Passing, Proceedings of the 2001 ACM/IEEE conference on Supercomputing, pp. 57, Denver, Piyush Shivam, et al., Nov. 10, 2001.
A Case Study in Application I/O on Linux Clusters, Proceedings of the 2001 ACM/IEEE conference on Supercomputing, pp. 11, Denver, Robert Ross, et al., Nov. 10, 2001.
On Making TCP More Robust to Packet Reordering, ACM Computer Communication Review, vol. 32, No. 1, E. Blanton and M. Allman, Jan. 2002.
Cramming more components onto integrated circuits, Electronics, vol. 38, No. 8, pp. 114-117, 1965, Gordon E. Moore, Apr. 19, 1965.
Programming Semantics for Multiprogrammed Computations, Communications of the ACM, vol. 9, No. 3, pp. 143-155, Jack B. Dennis and Earl C. Van Horn, Mar. 1966.
The Aloha System, ACM Computer Communication Review, vol. 4 No. 1, F.F. Kuo, Jan. 1974.
A Protocol for Packet Network Intercommunication, IEEE Transactions on Communications, vol. COM-22, No. 5, pp. 637-648, Vinton Cerf, Robert Kahn, May 1974.
Proposal for an International End-to-End Protocol, ACM Computer Communication Review, vol. 6 No. 1, p. 1-18, V. Cerf, et al., Jan. 1976.
Ethernet: distributed packet switching for local computer networks, Communications of the ACM, vol. 19, Issue 7, pp. 395-404, Robert M. Metcalfe and David R. Boggs, Jul. 1976.
Interrupt Driven Programming, Communications of the ACM, vol. 14, No. 6, p. 417-418, Marvin Zelkowits, Jun. 1971.
Synchronizing Processors with Memory-Content-Generated Interrupts, Communications of the ACM, vol. 16, No. 6, p. 350-351, J. Carver Hill, Jun. 1973.
Virtual cut-through: A new computer communication switching technique, Computer Networks, vol. 3, No. 4, pp. 267-286, P. Kermani and L. Kleinrock, Sep. 1979.
An Overview of the New Routing Algorithm for the ARPANET, Proceedings of the 6th Data Communications Symposium, p. 63, John M. McQuillan, et al., Nov. 1979.
Grapevine: An Exercise in Distributed Computing, Communications of the ACM, vol. 25, Issue 4, pp. 260-274, Andrew D. Birrell, et al., Apr. 1982.
The Architecture of the Universe Network, ACM Computer Communication Review, vol. 14, No. 2, pp. 2-9, Ian M. Leslie, et al., Jun. 1984.
Congestion Control in IP/TCP Internetworks, ACM Computer Communication Review, vol. 14, No. 4, p. 11-17, John Nagle, Oct. 1984.
Development of a TCP/IP for the IBM/370, ACM Computer Communication Review, vol. 15, No. 4, Robert M. Brandriff, et al., Sep. 1985.
Supercomputers on the Internet: A Case Study, ACM Computer Communication Review, vol. 17, No. 5, C. Kline, Aug. 1987.
Fragmentation Considered Harmful, ACM Computer Communication Review, vol. 17, No. 5, pp. 390-401, Christopher A. Kent, Jeffrey C. Mogul, Oct. 1987.
An Analysis of Memnet: An Experiment in High-Speed Shared-Memory Local Networking, ACM Computer Communication Review, vol. 18, No. 4, p. 165-174, Gary S. Delp, et al., Aug. 1988.
Measured Capacity of an Ethernet: Myths and Reality, ACM Computer Communication Review, vol. 18, No. 4, p. 222-234, David R. Boggs, et al., Aug. 1988.
The VMP Network Adapter Board (NAB): High-Performance Network Communication for Multiprocessors, ACM Computer Communication Review, vol. 18, No. 4, p. 175-187, H. Kanakia and D. Cheriton, Aug. 1988.
Congestion Avoidance and Control, ACM Computer Communication Review, vol. 18, No. 4, p. 314-329, V. Jacobson, Aug. 1988.
The Design Philosophy of the DARPA Internet Protocols, ACM Computer Communication Review, vol. 18, No. 4, pp. 106-114, David D. Clark, Aug. 1988.
Development of the Domain Name System, ACM Computer Communication Review, vol. 18, No. 4, pp. 123-133, Paul V. Mockapetris and Kevin J. Dunlap, Aug. 1988.
Performance Comparison of the Cray-2 and Cray X-MP/416 Supercomputers, Proceedings of the 1988 ACM/IEEE conference on Supercomputing, p. 288-295, Orlando, Florida, Margaret L. Simmons and Harvey J. Wasserman, Nov. 12, 1988.
Implementing TCP/IP on a Cray computer, ACM Computer Communication Review, vol. 19, No. 2, p. 11-15, David A. Borman, Apr. 1989.
Computing the Internet Checksum, ACM Computer Communication Review, vol. 19, No. 2, p. 86-94, R. Braden, et al., Apr. 1989.
An Analysis of TCP Processing Overhead, IEEE Communications Magazine, vol. 27, No. 6, pp. 23-29, David D. Clark, et al., Jun. 1989.
Sirpent: A High-Performance Internetworking Approach, ACM Computer Communication Review, vol. 19, No. 4, p. 158-169, David R. Cheriton, Sep. 1989.
Protocol Design for High Speed Networks, PhD Thesis, University of Cambridge, Derek Robert McAuley, Sep. 1989.
How Slow Is One Gigabit Per Second?, ACM Computer Communication Review, vol. 20, No. 1, p. 44-53, Craig Partridge, Jan. 1990.

(56) References Cited

OTHER PUBLICATIONS

Architectural Considerations for a New Generation of Protocols, ACM Computer Communication Review, vol. 20, No. 4, pp. 200-208, D. D. Clark and D. L. Tennenhouse, Sep. 1990.
Protocol Implementation on the Nectar Communication Processor, ACM Computer Communication Review, vol. 20, No. 4, p. 135-144, Eric C. Cooper, et al., Sep. 1990.
A Host-Network Interface Architecture for ATM, ACM Computer Communication Review, vol. 21, No. 4, Bruce S. Davie, Sep. 1991.
A High-Performance Host Interface for ATM Networks, ACM Computer Communication Review, vol. 21, No. 4, p. 317-325, C. Brendan S. Traw, Sep. 1991.
Fairisle: An ATM Network for the Local Area, ACM Computer Communication Review, vol. 21, No. 4, p. 327, Ian Leslie and Derek R. McAuley, Sep. 1991.
The Desk Area Network, ACM Operating Systems Review, vol. 25, Issue 4, p. 14-21, Mark Hayter and Derek McAuley, Oct. 1991.
An Integration of Network Communication with Workstation Architecture, ACM Computer Communication Review, vol. 21, No. 5, p. 18-29, 1991.
The Evolution of XTP, Proceedings of the Third International Conference on High Speed Networking,. Greg Chesson. Nov. 1991.
System support for multi-service traffic, University of Cambridge Computer Laboratory Technical Report No. 245, Michael J. Dixon, Jan. 1992.
ATOMIC: A Local Communication Network Created Through Repeated Application of Multicomputing Components, Made available by authors, Danny Cohen, Gregory Finn, Robert Felderman, Annette DeSchon, Jan. 10, 1992.
Message Authentication with One-Way Hash Functions, ACM Computer Communication Review, vol. 22, No. 5, pp. 29-38, Gene Tsudik, Oct. 1992.
Analyzing Communication Latency using the Nectar Communication Processor, ACM Computer Communication Review, vol. 22, No. 4, Peter Steenkiste, Oct. 1992.
Efficient Demultiplexing of Incoming TCP Packets, ACM Computer Communication Review, vol. 22, No. 4, Paul E. McKenney and Ken F. Dove, Oct. 1992.
TCP/IP on the Parallel Protocol Engine, Proceedings of the IFIP TC6/WG6.4 Fourth International Conference on High Performance Networking IV, Erich Ruetsche and Matthias Kaiserswerth, Dec. 14, 1992.
Hardware/Software organization of a high performance ATM host interface, IEEE Journal on Selected Areas in Communications, pp. 240-253, C. Traw and J. Smith, Feb. 1993.
The Architecture of Gb/s Multimedia Protocol Adapter, ACM Computer Communication Review, vol. 23, No. 3, E. Ruetsche, Jul. 1993.
Giving Applications Access to Gb/s Networking, IEEE Network, vol. 7, Issue 4, pp. 44-52, Jonathan M. Smith and C. Brendan S. Traw, Jul. 1993.
TCP Servers: Offloading TCP Processing in Internet Servers. Design, Implementation, and Performance, Technical Report DCR-TR-481, Computer Science Department, Rutgers University, Murali Rangarajan, et al., Mar. 2002.
ATM: A Retrospective on Systems Legacy, ACM Computer Communication Review, vol. 32, No. 5, Jon Crowcroft and Derek McAuley, Nov. 2002.
A Retrospective View of ATM, ACM Computer Communication Review, vol. 32, No. 5, pp. 13-19, Charles Kalmanek, Nov. 2002.
The Influence of ATM on Operating Systems, ACM Computer Communication Review, vol. 32, No. 5, pp. 29-37, Jonathan Smith, Nov. 2002.
An Overview of the BlueGene/L Supercomputer, Proceedings of the 2002 ACM/IEEE conference on Supercomputing, pp. 1-22, Baltimore, NR Adiga, et al., Nov. 16, 2002.
Ultra-High Performance Communication with MPI and the Sun Fire Link Interconnect, Proceedings of the 2002 ACM/IEEE conference on Supercomputing, p. 1-15, Baltimore, Steven J. Sistare and Christopher J. Jackson, Nov. 16, 2002.
Some Internet Architectural Guidelines and Philosophy, IETF Network Working Group, Request for Comments: 3439, R. Bush, D. Meyer, Dec. 2002.
F-RTO: An Enhanced Recovery Algorithm for TCP Retransmission Timeouts, ACM Computer Communication Review, vol. 33, No. 2, Pasi Sarolahti, et al., Apr. 2003.
Scalable TCP: Improving Performance in Highspeed Wide Area Networks, ACM Computer Communication Review, vol. 33, No. 2, pp. 83-91, Tom Kelly, Apr. 2003.
TCP offload is a dumb idea whose time has come, Proceedings of HotOS IX: The 9th Workshop on Hot Topics in Operating Systems, pp. 25-30, Jeffrey C. Mogul, May 18, 2003.
A case for Virtual Channel Processors, Proceedings of the ACM SIGCOMM 2003 Workshops, Derek McAuley and Rolf Neugebauer, Aug. 2003.
Initial End-to-End Performance Evaluation of 10-Gigabit Ethernet, Proceedings of the 11th Symposium on High Performance Interconnects, Justin Hurwitz and Wu-chun Feng, Aug. 20, 2003.
Workshop on network-I/O convergence: experience, lessons, implications (NICELI), ACM Computer Communication Review, vol. 33, No. 5, Vinay Aggarwal, et al., Oct. 2003.
Optimizing 10-Gigabit Ethernet for Networks ofWorkstations, Clusters, and Grids: A Case Study, Proceedings of the 2003 ACM/IEEE conference on Supercomputing, Phoenix, Arizona, Wu-chun Feng, et al., Nov. 15, 2003.
Performance Comparison of MPI Implementations over InfiniBand, Myrinet and Quadrics, Proceedings of the 2003 ACM/IEEE conference on Supercomputing, Phoenix, Arizona, Jiuxing Liu, et al., Nov. 15, 2003.
Architectural Characterization of TCP/IP Packet Processing on the Pentium M Processor, Proceedings of the 10th International Symposium on High Performance Computer Architecture, pp. 152, Srihari Makineni and Ravi Iyer, Feb. 14, 2004.
Fast TCP: Motivation, Architecture, Algorithms, Performance, Proceedings of IEEE Infocom, pp. 1246-1259, Cheng Jin, et al., Mar. 7, 2004.
TCP Offload to the Rescue, ACM Queue, vol. 2, No. 3, Andy Currid, May 1, 2004.
TCP Onloading for Data Center Servers, Computer, IEEE Computer Society, vol. 37, No. 11, pp. 48-58, Greg Regnier, et al., Nov. 2004.
Declaration of Dr Gregory L Chesson in *Alacritech* v. *Microsoft*, United States District Court, Northern District California, San Francisco Division, Gregory L. Chesson, Feb. 4, 2005.
Computing Research: A Looming Crisis, ACM Computer Communication Review, vol. 35, No. 2, Edward D. Lazowska and David A. Patterson, Jul. 2005.
Performance Characterization of a 10-Gigabit Ethernet TOE, Proceedings of the 13th Symposium on High Performance Interconnects, W. Feng, et al., Aug. 17, 2005.
User-level device drivers: Achieved performance, J. Comput. Sci. & Technol., vol. 20, B. Leslie, et al., Sep. 2005.
Head-to-Toe Evaluation of High-Performance Sockets Over Protocol Offload Engines, Proceedings of the IEEE International Conference on Cluster Computing, P. Balaji, et al., Sep. 2005.
SCTP versus TCP for MPI, Proceedings of the 2005 ACM/IEEE conference on Supercomputing, Seattle, p. 30, Washington, Humaira Kamal, et al., Nov. 12, 2005.
LTCP: Improving the Performance of TCP in Highspeed Networks, ACM Computer Communication Review, vol. 36, No. 1, pp. 41-50, Sumitha Bhandarkar, et al., Jan. 2006.
Zero-Copy TCP in Solaris, Proceedings of the USENIX Annual Technical Conference, H. K. Jerry Chu, Jan. 1996.
Reflections on Network Architecture: an Active Networking Perspective, ACM Computer Communication Review, vol. 36, No. 2, pp. 27-30, Ken Calvert, Apr. 2006.
10 Networking Papers: Recommended Reading, ACM Computer Communication Review, vol. 36, No. 2, pp. 51-52, Jon Crowcroft, Apr. 2006.
Flow labelled IP over ATM: design and rationale, ACM Computer Communication Review, vol. 36, No. 3, pp. 79-92, Greg Minshall, et al., Jul. 2006.

(56) References Cited

OTHER PUBLICATIONS

10 Networking Papers: Readings for Protocol Design, ACM Computer Communication Review, vol. 36, No. 3, pp. 77-78, David Wetherall, Jul. 2006.
A Critique of RDMA, HPCWire article: http://www.hpcwire.com/features/17886984.html,Patrick Geoffray, Aug. 18, 2006.
The NE010 iWARP Adapter, Open Fabrics Alliance, Gary Montry, May 2006.
Protocol Onload vs. Offload, Intel, Greg Regnier, Date Unknown.
Protocol Onloading vs. Offloading in High Performance Networks, Pacific Northwest Laboratories by Batelle for the U.S. Department of Energy, Fabrizio Petrini, Date Unknown.
Thoughts about TCP Offloading, My 2003 HotOS paper title: TCP Offload is a dumd idea whose time has to come, HP Labs (Not speaking for HP), Jeff Mogul, Aug. 2006.
Protocol Offloading vs. Onloading in High Performance Networks, Hot Interconnect Panel, System Interconnect Group, Qlogic Corporation, Lloyd Dickman CTO, Aug. 23, 2006.
Protocol off-loading vs. on-loading in high performance networks, Hot Interconnects, Myricom®, Patrick Geoffray, 2006.
Quantifying the Potential Benefit of Overlapping Communication and Computation in Large-Scale Scientific Applications, Proceedings of the 2006 ACM/IEEE conference on Supercomputing, Tampa, Florida, Jose Carlos Sancho, et al., Nov. 11, 2006.
High-Performance and Scalable MPI over InfiniBand with Reduced Memory Usage: An In-Depth Performance Analysis, Proceedings of the 2006 ACM/IEEE conference on Supercomputing, Tampa, Florida, Sayantan Sur, et al., Nov. 11, 2006.
10Gb/s Ethernet Performance and Retrospective, ACM Computer Communication Review, vol. 37, No. 2, pp. 89-92, Steven Pope and David Riddoch, Mar. 19, 2007.
Getting 10 Gb/s from Xen, Euro-Par Conference 2007, pp. 224-233, Rennes, France, Kieran Mansley, et al., Aug. 28, 2007.
Use of message-based multicomputer components to construct gigabit networks, ACM Computer Communication Review, vol. 23, No. 4, p. 32-44, Danny Cohen, et al., Jul. 1993.
The End of History, IEEE TCGN Gigabit Networking Workshop, J. Evans and T. Buller, Apr. 22, 2001.
The Cambridge Model Distributed System, ACM SIGOPS Operating Systems Review, vol. 14, Issue 1, pp. 21-29, M.V. Wilkes and R.M. Needham, Jan. 1980.
Devices in a Multi-Service Operating System, Paul Ronald Barham, Churchill College University of Cambridge, Jul. 1996, 142 pages.

\* cited by examiner

DUAL-DRIVER INTERFACE

FIELD OF THE INVENTION

This invention relates to a network interface, for example an interface device for linking a computer to a network.

BACKGROUND

Traditionally, operating systems have provided a number of abstract internal interfaces which have been designed to support the various families of hardware devices connected to the system; for example, storage, networking, graphics. Operating systems typically also provide a driver model which enables bespoke hardware to be connected which does not fit a standard driver model. In the current Microsoft Windows implementation the network model is called NDIS and the generic driver model is called WDM. Implementation rules state that an NDIS device driver should not directly interact with a WDM driver. This is also good engineering practice.

Typical network interface devices do not support NDIS as a vertical (peer) interface to WDM. Thus, for instance, the IETF RDMA consortium and the Infiniband architectures are not defined with a vertically separated structure. An example of such an architecture is shown in FIG. 1. This architecture presents difficulties in supporting both standard kernel based network services at the same time as application-level network services and invites the layering of functionality: for example, building NDIS driver functionality above the Kernel AGENT or as part of the kernel AGENT.

It has been proposed to provide a network interface that presents a user-level network interface with a driver architecture which supports (a) a protected control interface which is accessible from user level transport libraries and (b) a standard network driver interface. In the past, such an architecture has been realised by layering such an interface (b) on top of such an interface (a). This approach has the advantage that it is relatively easy to pass messages between the drivers. However, this approach is inefficient, especially in the Windows architecture, and it has the disadvantage that both drivers must be loaded in order for the interface (b) to be operated and that interface (a) must expose an upper layer API for (b) as well as a control API for user level transport libraries.

According to the present invention there is provided apparatus and methods as set out in the accompanying claims.

SUMMARY

In one embodiment as disclosed herein a network interface device is provided which is capable of communication with a data processing system supporting an operating system and at least one application. In this example embodiment the network interface device supports communication with the operating system by means of two or more data channels such that each data channel is individually addressable by the network interface device and capable of carrying application-level data between the network interface device and the data processing device. Also part of this embodiment is a control channel individually addressable by the network interface device and capable of carrying control data between the data processing system and the network interface device. The control data define commands and the network interface is responsive to at least one command sent over the control channel to establish at least one additional such data channel.

In one embodiment the network interface device is capable of transmitting to the data processing system independent interrupt messages for the control channel and at least one of the data channels. In addition, the network interface device may be configured with a set of resources that can be allocated to tasks to be performed by the network interface device and is responsive to at least one command sent over the control channel to alter the allocation of the resources to tasks to be performed by the network interface device. It is contemplated that the resources may comprise hardware resources. In addition, the network interface device may be capable of supporting a communication link with another network device and the resources may comprise the state of the link. Also disclosed herein is the network interface device wherein the network interface device is capable of filtering data passing over one or more of the data channels in accordance with predefined filter conditions and the resources comprise the filter conditions. In any various embodiment the one or more of the data channels is capable of carrying control data defining commands and the network interface is responsive to those commands to configure the state of the network interface device. For example, the network interface device may be capable of supporting a communication link with another network interface device without a control channel being established.

It is further contemplated that at least one of the data channels may be operable according to the network device identification specification (NDIS) interface. Likewise, the control channel may be operable according to the windows device model (WDM). In addition, the network interface device may be is capable of supporting a communication link with another network interface device and of transmitting over the link application-level data received over one of the data channels. It is further contemplated that the network interface device may be capable of supporting a communication link with another network interface device and of transmitting over a data channel data received over the link. The network interface card may be capable of transmitting and/or receiving data over the data channel in the form of data packets or in internet protocol packets. Furthermore, the device may be being capable of generating status report messages of a plurality of types and of receiving from each channel an indication of which of the status report messages are to be sent to that channel. The device may also be arranged to send to each channel only those status report messages that match the types indicated in the indication received from that channel.

In one embodiment the indication is a mask such that one bit corresponds to each type of status report message, and a first value of a bit indicates that status report messages of the corresponding type should be sent to the respective channel, and a second value of a bit indicates that status report messages of the corresponding type should not be sent to the respective channel. It is contemplated that each data channel supports an event queue and the network interface is arranged to, in order to pass data to a channel, apply an event message to the event queue of that channel. It is further contemplated each data channel may be capable of being triggered to read data from the event queue that it supports by means of an interrupt received from the network interface device by the data processing system, and, in addition, the network interface device may be capable of applying such an interrupt to the data processing system. In various embodiments one or more or each channel may be capable of being so triggered by means of a single interrupt.

In one embodiment the network interface device is arranged to apply the interrupt if the event queue includes event messages. Moreover, the network interface device may be arranged to apply the interrupt if the event queue includes more than a predetermined number of event messages. Likewise, the network interface device may be arranged to apply the said interrupt if an event message has been included in the event queue for longer than a predetermined period of time. Or, the network interface device may be arranged to apply the interrupt if longer than a predetermined period of time has elapsed since the event queue was empty of messages.

In one embodiment, the network device may be arranged to, on deactivation of the control channel, signal each data channel with a message indicative of deactivation of the control channel. Moreover, the network interface device may be arranged to store for each channel that is capable of receiving control messages a data set indicating for a plurality of types of control message which of those types of control message are to be sent to that channel, and the network interface device may be arranged to send control messages to the channels in accordance with the stored data sets. In addition, the network device may be arranged to, on receiving a message from one of the channels that is indicative of a request to apply data to another of the channels, apply the data to the other of the channels.

It is further contemplated that the data processing system may be arranged to store, for each channel, an indication of whether that channel is a data channel or a control channel.

Also disclosed herein is a method for communicating with a network interface device by means of a data processing system supporting an operating system and at least one application. One example embodiment, this method comprises establishing two or more data channels such that each data channel is individually addressable by the network interface device and is capable of carrying application-level data between the network interface device and the data processing device. This method also includes the steps of establishing a control channel individually addressable by the network interface device and capable of carrying control data between the network interface device. As such, the control data may define commands and the network interface may be responsive to at least one command sent over the control channel to establish at least one additional data channel.

In yet another method of operation, a method is provided for communicating with a network interface device by means of a data processing system supporting an operating system and at least one application. This steps of this method comprise establishing one or more channels, each channel being capable of carrying data between the network interface device and the data processing device. The method also communicates from one of the channels to the other data indicative of the status and/or capability of the one channel and based on that communicated data, determines which of the channels is to act as a control channel for carrying control data between the network interface device, and which of the channels is to act as a data channel for carrying application-level data between the network interface device and the data processing device.

In addition, also disclosed herein is an operating system capable of communication with a network interface device by means of a data channel capable of carrying application-level data between the network interface device and the data processing device and a control channel capable of carrying control data between the network interface device, the control data defining commands and the network interface being responsive to at least one command sent over the control channel to establish at least one additional data channel, wherein the data channel and the control channel are supported by separate driver spaces of the operating system. It is further contemplated that the operating system may be arranged to act independently on interrupt messages received from the network interface device for the control channel and at least one of the data channels.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views. The present invention will now be described by way of example with reference to the accompanying drawings, in which.

DETAILED DESCRIPTION

Figure 1:
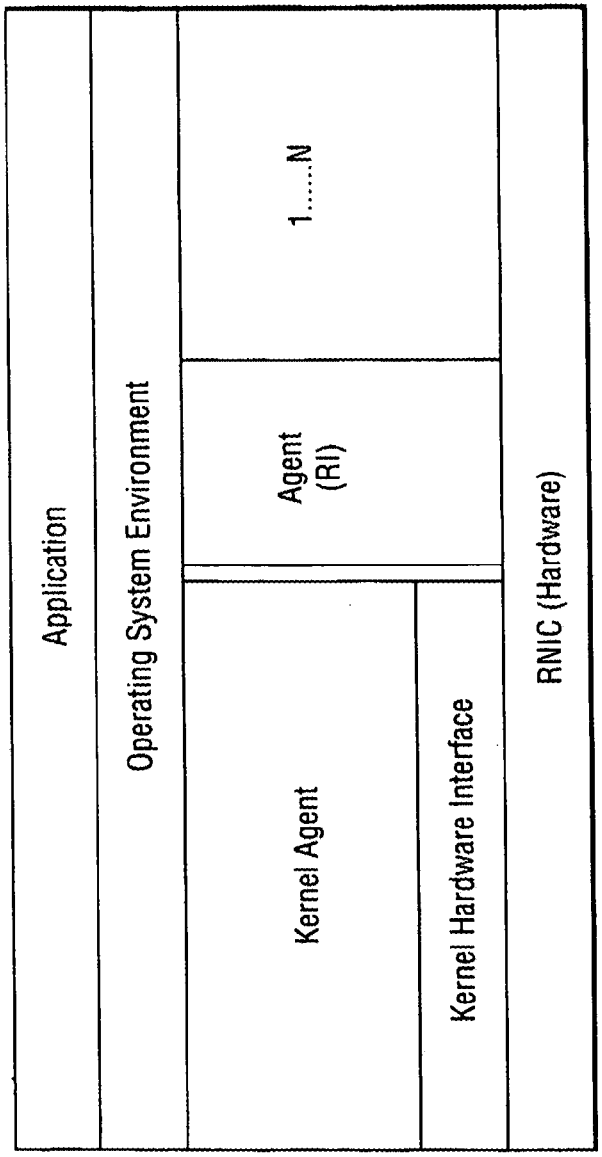
FIG. 1 shows an example of a prior driver structure for a user-accessible network.
Figure 2:
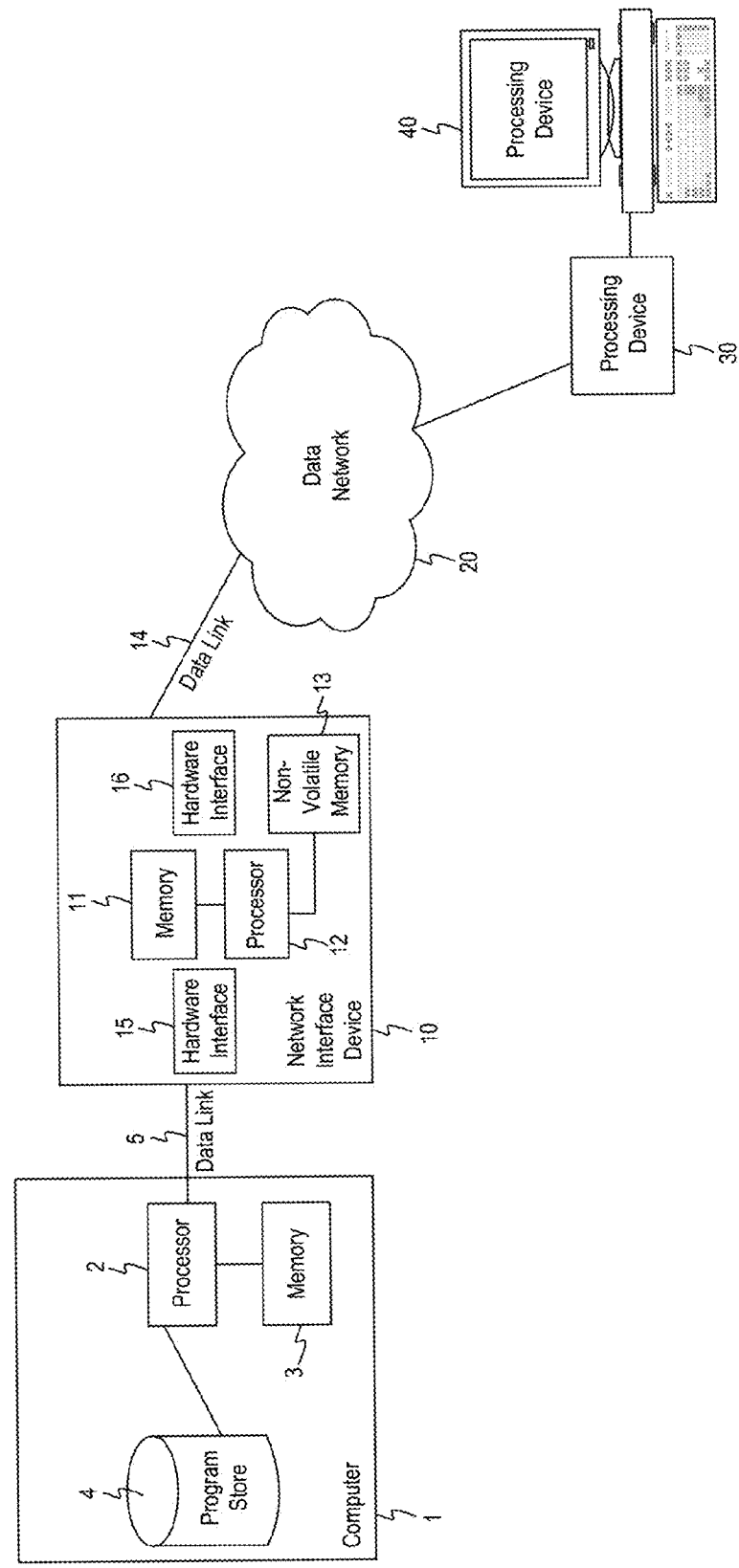
FIG. 2 is a schematic diagram of a network interface device in use.

FIG. 2 is a schematic diagram showing a network interface device and the general architecture of the system in which it may be used. The network interface device 10 is connected via a data link 5 to a processing device such as computer 1, and via a data link 14 to a data network 20. Further network interface devices such as processing device 30 are also connected to the network, providing interfaces between the network and further processing devices such as processing device 40.

The computer 1 may, for example, be a personal computer, a server or a dedicated processing device such as a data logger or controller. In this example it comprises a processor 2, a program store 4 and a memory 3. The program store stores instructions defining an operating system and applications that can run on that operating system. The operating system provides means such as drivers and interface libraries by means of which applications can access peripheral hardware devices connected to the computer.

As in typical operating systems, the drivers may be of two types: generic and specific. A generic driver provides a standard interface to the OS for peripheral devices of a certain type: for example network interface devices. The advantage of this is that the OS can provide support functions, for example Ethernet ARP support for all devices of the generic type. A specific example of this would be an NDIS miniport driver which plugs into the Windows NDIS driver architecture. A specific driver provides an interface to a specific device. This would typically be provided as driver software that can be used by the operating system to support the specific driver interface. An example of this is a Windows WDM driver. Such a driver may provide any API required for user level applications or transport libraries.

The link 5 may be a serial or parallel link. In a typical example it could be a PCI bus.

The network interface device 10 could be a stand-alone device or an internal device such as a network interface card (NIC). The device 10 comprises a processor (or hardware logic) 12, a non-volatile memory 13 that stores instructions for execution by the processor (or to configure the hardware logic) to implement network interface functions, including the establishment and support of protocol stacks for communication with the computer 1, and a memory 11 for use as a temporary data store and buffer. The network interface device has hardware interfaces 15, 16 by means of which it is connected to the links 5, 14. These handle physical layer issues such as voltage regulation for the links. Some or all of the functions of the network interface device could be handled in firmware or hardware.

Typically the network interface device will implement packet-switched communications over the network link 14. Thus, it will send and receive traffic data as packets over that link. The packets may, for example, be IP (internet protocol) packets, but could be of another form.

Figure 3:
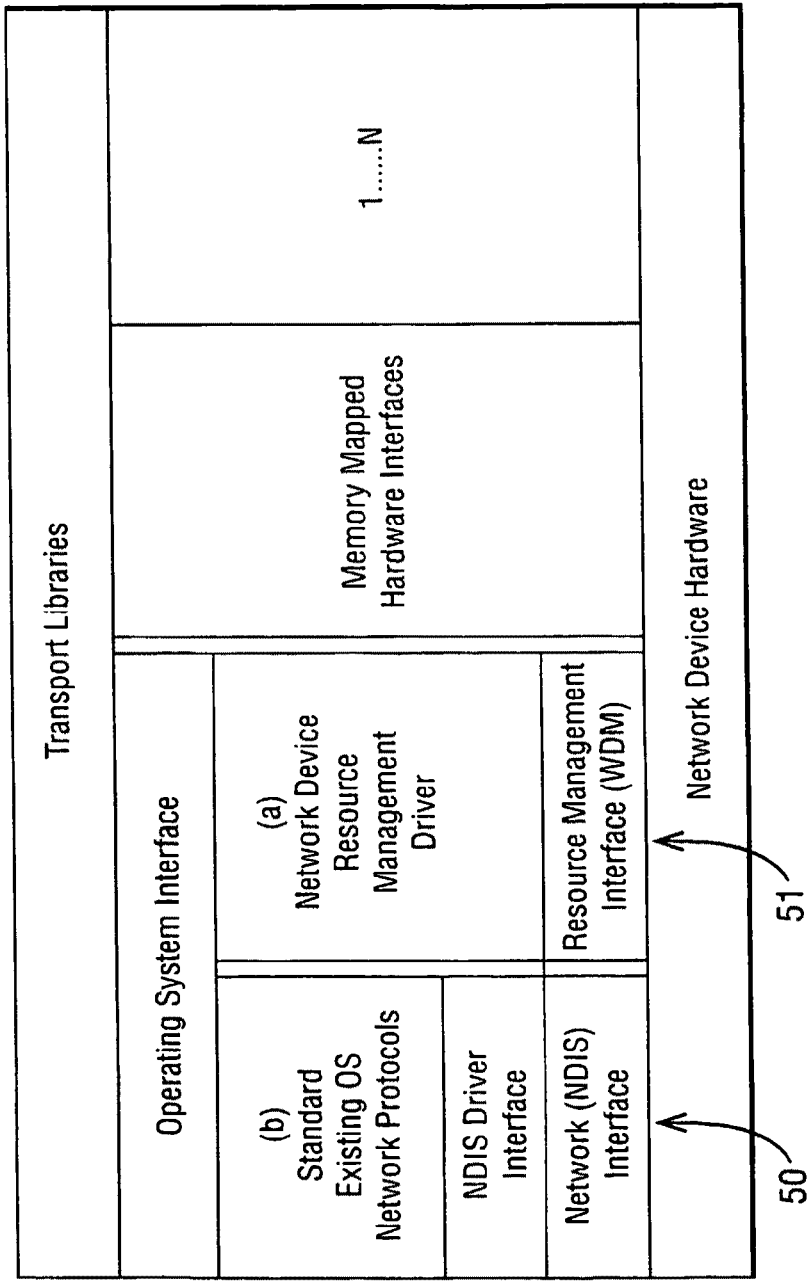
FIG. 3 shows an example of a driver structure according to the present invention.

An example of a driver structure that can be established in an example of the present invention is shown in FIG. 3. It comprises two parallel driver stacks 50, 51 that interface from a data processing device such as computer 1 on to network device hardware such as network interface device 10. In this example the computer 1 implements a Windows operating system but the invention is not limited to such an implementation. Stack 51 represents a WDM-type stack which implements the hardware control plane. Stack 50 represents an NDIS-type stack which implements the standard driver interface. Transport libraries may access the network device hardware directly once hardware resources have been allocated through the WDM interface.

The stacks 50 and 51 of FIG. 3 are most preferably completely separate (vertically separated). They are preferably independent of each other such that individual communications over one stack are independent of those over the other stack. The drivers are individually thus independently addressable. The network interface device can provide data to each device independently of the other. As described below, this may conveniently be achieved by each driver supporting a respective input queue. When each driver is established it can be allocated a memory area for use as that queue. The address of the queue can be transmitted to and stored by the interface device when the queue is established. To achieve this each driver may, on initiation, be allocated a region of memory that is accessible by both the driver and the network interface device. The location of that region is provided then passed to the network interface device for use, which can store in addressing that that area data (whether traffic or control data) that is directed to the respective driver. In that way each driver can be addressed independently of the other.

In order to support two independent vertical driver structures in this way, the network device hardware may be presented to the operating system as a multi-function device. This technique is often used where integrated peripherals contain devices of more than one type, for example a PC card that provides a combination network interface and modem. However, in the present instance both devices are of the same type: i.e. a network interface. By presenting two interfaces, the operating system driver management software (e.g. the Windows hardware plug-n-play subsystem) can readily load or unload and configure both the hardware control plane and standard driver interface drivers (WDM and NDIS drivers in the case of Windows) separately and independently even though they both correspond to the same physical device functionality.

Care should be taken to allow the hardware to be correctly managed at all times no matter what the state of the drivers. In particular, it should be possible to manage the hardware or bring it into a manageable state in the cases that either or both drivers are active. Correct operation should occur when interrupts and events are to be delivered to the driver(s) and under conditions where a driver must communicate state to a peer driver without a direct software mechanism being available.

A network interface device according to an example of the present invention can use events as the basic means of delivering error and control information to the operating system and transport libraries. To achieve this the network interface can provide information in the form of an event data block to the data processing device 1 by way of one of the stacks. Events passed in this way are applied to an event queue, which would typically be implemented in a first-in-first-out manner by the use of read and write pointers that are incremented through a buffer that holds the queue as events are read from and written to it. A driver operating on the data processing device can be triggered to read a queue by means of an interrupt applied to the data processing device by the source of the events. Such events can be used to pass to the data processing device control data as well as traffic data received by the network interface device over the link 14. Thus, interrupts provide a hardware mechanism by which the network interface device can request the execution of one or another of the device drivers; and can correspond to a physical interrupt line which can be asserted by the network interface device. On assertion of the interrupt line, the CPU 2 will context switch to its interrupt handler which has the task of executing the relevant device driver code. On a bus such as PCI there may be more devices than interrupt lines, and so a number of device drivers may be registered with single physical interrupt. Hence it is possible to register both the WDM and NDIS interfaces for the some physical interrupt line so long as both are able to quickly and efficiently establish whether the interrupt was for them. On a bus without the ability to share interrupt lines or where the bus is able to support multiple interrupt lines for a device, the device would implement two independent interrupt lines.

Figure 4:
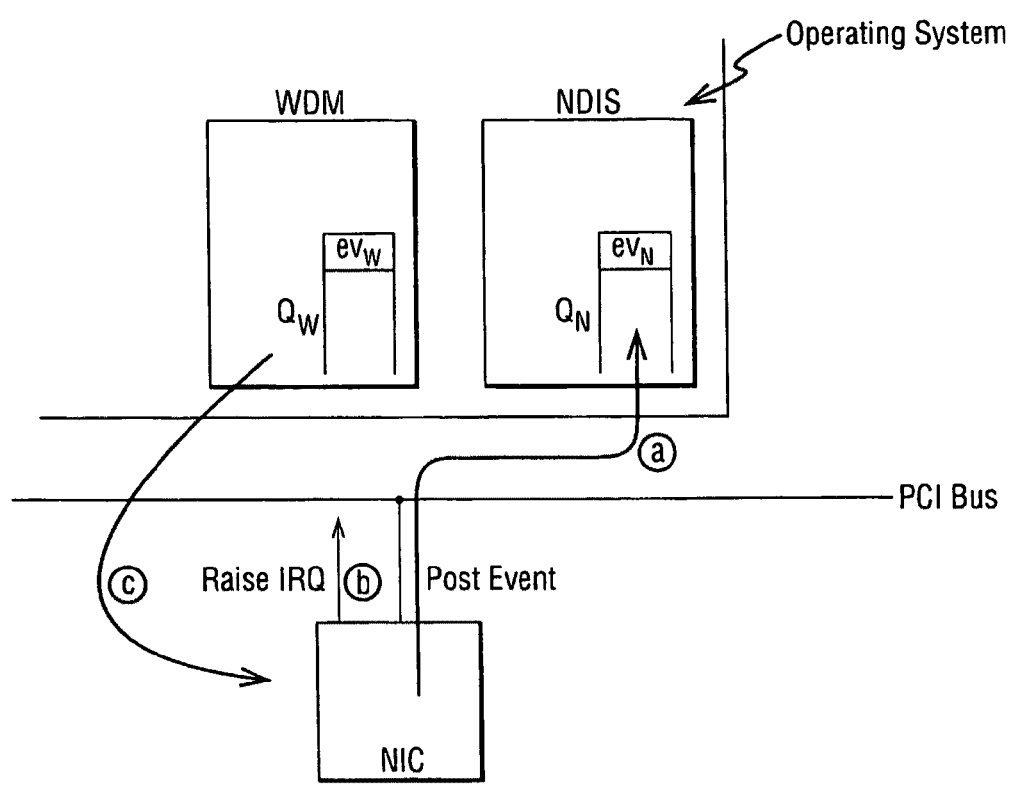
FIG. 4 illustrates transfer of information by means of a shared interrupt line.

FIG. 4 illustrates how the transfer of information may be achieved via a shared interrupt line. At step [a] the network interface device posts data to the driver event queue (which is pre registered). Then in step [b] the network interface device asserts the interrupt (IRQ) line. Because both drivers have registered with the operating system for the save interrupt, they both are executed. However each may determine whether the interrupt was for them by means of inspecting their own private event queue. The cost of executing both drivers and their inspection process is typically small—e.g. only few hundred processor cycles. As the drivers independently consume events from their event queues, they write pointer updates back to the network interface device. Hence the network interface device is able to determine which event queues have outstanding events by pointer comparison. (or by some other form of acknowledgement such as the device noticing a read from a per queue status register) The network interface device arranges to assert its interrupt line so long as there is at least one outstanding event for an event queue which has its interrupt enabled, for example by asserting an interrupt until the driver reads its interrupt event register. Other policies could be implemented: for example an interrupt hold-off policy, in which an interrupt is only applied if the number of outstanding events is greater than a predetermined number, or if an event has been waiting on the queue for longer than a predetermined time.

More particularly, in the preferred embodiment the data and control channels are arranged to be responsive to one or more interrupts in order to read events from their respective queues. On reading an event from its queue a channel deletes the event from the queue, freeing space in the queue for the application of more events to the queue. The queue conveniently operates in a first-in-first-out manner as indicated above. A number of strategies can be employed for the timing of the removal of the events. First, the driver or transport library that is to read data from a queue may be arranged to poll the queue from time to time in order to determine whether there are events on the queue. The interval between pollings may be dependent on the state of the queue: for instance if no data was found in the queue on the last polling then the interval may be increase, and vice versa. Alternatively or in addition the driver or transport library may be responsive to an interrupt corresponding to its queue to poll the queue. There may be one interrupt per queue, or one interrupt may be shared between multiple queues. When each channel is set up the network interface device is informed of, and stores, the identity of the interrupt corresponding to the respective queue. The network interface device may implement one of a number of strategies for asserting the interrupts, and different strategies may be employed for each channel. In each case, the network interface device is pre-programmed with the criteria that are to trigger the interrupt to be asserted. It then determines if those criteria are met, and if so it asserts the interrupt. Examples of available strategies are as follows:

a. the interrupt is asserted if there is data on the queue;

b. the interrupt is asserted if any event has remained on the queue for longer than a predetermined time;

c. the interrupt is asserted if the queue has remained un-empty for longer than the same or another predetermined time.

Hybrids of these strategies could be used. The driver or transport library can clear the interrupt on emptying its queue, or on taking data off the queue.

If an event has remained on a queue for an extended period of time it could be that that queue is stuck because the application, driver or transport library that was associated with that queue has failed, or has been terminated or de-scheduled. Therefore, in a situation such as those listed at a. to c. above, instead of issuing an interrupt that is to be dealt with by the entity with which the respective queue is associated the network interface device could the network interface device could issue an event (optionally with an associated interrupt) to another of the queues, preferably the queue of a control channel. That event could indicate its nature (i.e. an indication of a stuck queue) and the identity of the stuck queue. The entity associated with that queue, which is preferably a control entity such as one of the drivers is preferably arranged to respond to such a message by accessing and freeing the indicated queue.

Events which are delivered by the network interface device may come in a number of distinct categories:

(a) Management events—for example information which indicates that the network interface device's physical media (e.g. cable) has changed state (e.g. is unplugged). It is highly desirable that exactly one driver receives and handles management events.

(b) Delivery events—for example events that indicate the NDIS driver has received a data packet or a WDM client has received data in one of its posted buffers. It is essential that a delivery event is sent to the appropriate driver or client (for example Transport Library) which is equipped to handle the particular event.

Delivery of event types (b) and (c) can be controlled by an event queue binding which is identified by the delivery address of the action which caused the event (for example the IP header information of a delivered packet.). Thus the event can be sent to a specific event queue by the network interface card. If the event is of a type which requires an interrupt to be asserted, then on application of an interrupt to the data processor both drivers will interrogate their event queues and the driver to whose queue the event was applied. To avoid overflow, the system maintains a bound of the number of potential events which may be delivered at any one time onto a queue.

Each user-level virtual interface may bind its event queue with one of $Q_N$ (the NDIS event queue) or $Q_W$ (the WDM event queue). In practice this would be expected always to be $Q_W$ since management requests from user level transport libraries will always be expected to be directed to the WDM driver. Similarly the NDIS driver is allocated (implicitly by virtue of the multifunction hardware mapping described above—e.g. by PCI aperture) its own virtual interface which is bound to event queue $Q_N$.

Hence so far as delivery is concerned the network interface device supports only one abstraction and the NDIS driver and all user-level clients are treated as instances of the same abstraction. This greatly simplifies hardware design.

Delivery of events of type (a) can be controlled by means of an event delivery mask. This is akin to a standard interrupt mask, but is independently implemented for each multifunction device—in the present case for the NDIS and WDM functions. By a driver setting a bit in its own event delivery mask it is in effect contracting with the network interface device to handle the event type which is specified by the bit and thus also requesting that the network interface device deliver events of that type.

In practice, the network interface device could be connected by a data bus (e.g. a PCI bus) to the processor or other unit that it is to serve. On connection of the device to the unit it will typically be necessary for the unit to load the drivers necessary for its operation. As described above, those may be drivers of two different types (e.g. WDM and NDIS in a windows environment). Alternatively, they may be independently operable drivers of the same type. Where this is supported, it is preferred that the device is configured to trigger the unit to load the appropriate drivers, for example by means of a plug-and-play mechanism. To achieve this it may be necessary for the device to present itself to the unit as two apparently independent devices.

The drivers provide two independent channels by which communication with the network interface device may take place. Preferably one of the drivers (e.g. the NDIS driver in a Windows implementation) is capable of transferring traffic data between the network device and the unit that it serves, thus providing a data channel. That driver can preferably also carry control data between the network device and the unit. The other driver (e.g. the WDM driver in a Windows implementation) is capable of transferring control data between the network device and the unit that it serves, thus providing a control channel. The control data may pass in either or both directions between the driver and the network device. The control data could include commands to the network device, for the purpose of controlling its operations, and commands to the driver, for example to initiate the opening or closing of data channels or to report on the status of the network device or its connections with a host computer. The said other driver may but need not be able to carry traffic data: it could carry exclusively control data.

As described above, further data channels may be established (see memory mapped hardware interfaces 1 . . . N in FIG. 3). The establishment of one of these channels may be triggered from an application or other task on the unit to which the network interface device is connected. The further data channels are preferably established by a transport library of the device which, on request from an application, can determine from the operating system and/or the drivers the parameters that are to be associated with that channel, can allocate resources to the channel and signal the details of the channel to the network interface device. Having been set up, the further data channels can preferably be accessed by the network interface device without passing through the drivers. One means by which this may be arranged is for there to be a memory that is accessible to both the further data channels (or the application or library that manages them) and the network interface device. Such memory may reside on the device or, more preferably, on the unit that it serves and on which the data channels run. In the latter case the network interface device may access the memory via the bus or other data path by which it is connected to the unit. Separate areas of the memory are allocated to each further data channel, and the addresses of those areas are signalled to and stored by the network interface device. When the network interface device wishes to pass data (typically data deriving from network traffic) to a further data channel it writes that data to the area of memory corresponding to that data channel (or a part of it dedicated for data reception), which area operates as a data buffer for that channel. The channel can then read the data from that area. Similarly, when a further data channel wishes to send data over the network via the network interface device it can write that data to the memory area (or a part of it dedicated for data sending). The network interface device can then read the data from that area and send it over the network. The address of the memory area can be allocated by one of the drivers when the data channel is set up.

The data channel and the network interface device may regularly poll the data receiving part and the data sending part respectively in order to determine whether there is data to receive/send that should be cleared from the buffer. Alternatively, or in addition, a signalling means such as interrupts may be provided in order for each of the data channel and the network interface device to signal the other that data is waiting to be read. Most preferably one interrupt on the unit served by the network interface device is allocated to each further data channel, and to each driver. This allows the network interface device to signal each driver or further data channel, by setting the appropriate interrupt, that data has been placed on the buffer for that entity. Means is preferably provided to allow each of the data channel and the network interface device to control the flow of data from the other in to the memory area as data is read, so as to prevent corruption.

In order that the network interface device can allocate incoming traffic data to the appropriate data channel, each further data channel is allocated a port number when it is set up. The port number of each further data channel is sent to the network interface device, where that data is stored.

Incoming traffic data is analysed by the network interface device to determine its destination port, and is passed to the further data channel corresponding to that port. If the destination port of incoming data does not match any of the ports allocated to the further data channels then it is passed to one of the drivers (in the preferred embodiment to the driver that can receive traffic data) for handling by it.

For each event type the network interface device will allow either only one driver, or both drivers to set the bit in its event mask. Failure to set a bit indicates to the driver that it has failed to establish control/management of a particular event. For example both drivers may receive an informational management event (say link speed change) which requires no action on the hardware, but only one driver may receive a management event say (link down) which requires the driver to interact with the hardware. Hence at driver load time, one driver is nominated as a master the other as a slave by configuration information such as data stored in the Windows registry. A master driver will register with hardware for all management events and will also perform start of the day initialisation of the hardware. A slave driver will only register for information management events and will not attempt to manage initialisation or error conditions from the hardware. It is interpreted as a configuration error to attempt to load two slave drivers or two master drivers on the same machine. The former can be detected by the slave provided that it can detect from the network interface device's status registers that no driver has registered for events. The latter can be detected by a master failing to set an event register bit. The network interface device provides a DRIVER-UNLOAD information event when a master driver is unloaded, this provides a means whereby a slave driver can be informed that it is running alone, giving it the opportunity to request that its status be upgraded to master. This mechanism reduces the need for communication between the drivers since each driver can infer from the network interface device hardware the state information that it needs to configure its operations and permits correct operation even where system configuration information is incorrect.

The mechanisms described above enable two independent device drivers to manage the same hardware efficiently and without requiring linkage or shared state. There are however some situations where it may be desirable for one driver to send information to the other. This is accomplished by the network interface device providing the facility to enable each driver's event queue to be addressed as a destination for a control event which is sent by the other driver. On receipt of such an event, from the connected data processing device the network interface device will deliver the event locally to the appropriate event queue. For example it may be that the WDM driver requires MAC address information returned by ARP packets which are processed by the NDIS driver. An extension to the NDIS driver would pass ARP information to the WDM driver using the local event delivery mechanism.

Figure 5:
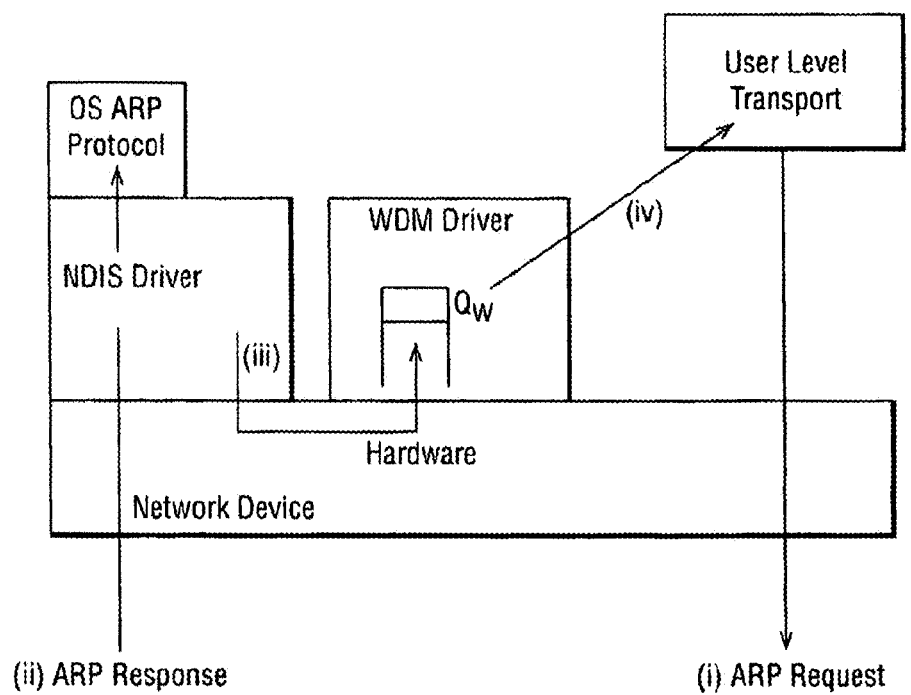
FIG. 5 illustrates transfer of events between drivers.

FIG. 5 illustrates an example of this procedure. With reference to the steps in FIG. 5, the steps may be as follows:

(i) A user level transport may directly send an ARP request (or else it may request the WDM driver to do it)

(ii) The ARP response (being a standard Ethernet packet with no user-level handler) will be delivered to the NDIS driver along with a data delivery event. The NDIS driver pushes the ARP packet up its delivery chain to the OS ARP protocol code which manages the ARP cache held by the system.

(iii) The NDIS driver also sends an ARP update event to the WDM driver (iv) The WDM driver responds to the user-level transport with the information It should be noted that this mechanism does not require an NDIS driver to be present. If it were absent then the WDM could simply manage the ARP reply directly. Also in the situation where both drivers are also present it is possible for the user level transport to query ARP information by normal system means.—albeit at reduced performance The network interface device could be embodied as a network interface card. Alternatively the network interface device could be embodied on an integrated circuit that could reside on the host, or it could be embedded in other data processing equipment. The host device could be a computer, for instance a personal computer or a server.

The network interface device is capable of communicating with other network devices over a data network. Such devices could be other network interface devices, dedicated network terminal devices, or network infrastructure devices such as routers or switches.

It is also possible for the control events to pass longer blocks of information by specifying the address of a memory buffer which holds the information.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention. In addition, while various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A network interface device comprising:
   a first hardware interface configured to connect said network interface device with a data processing system supporting an operating system and at least one application;
   a second hardware interface configured to connect said network interface device with a network; and
   at least one processor and at least one memory configured to:
     communicate with a first driver of the data processing system and a second driver of the data processing system, wherein the first driver has a first event queue, the second driver has a second event queue;
     individually address respective data to each driver independently and directly by placing an event data block on the event queue associated with the respective driver being addressed;
     determine if the event data block is of a first type or a second type;
     if the event data block is of the first type, place an event data block on the event queue associated with the first driver;
     if the event data block is of the second type, place an event data block on the event queue associated with the second driver; and
     subsequently request execution of the respective driver by raising an interrupt.

2. The network interface device of claim 1 wherein a transfer of data between the network interface device via the first hardware interface and the first driver is independent of the transfer of data between the network interface device via the first hardware interface and second driver.

3. The network interface device of claim 2 wherein the first and second drivers are vertically separate.

4. The network interface device of claim 1 wherein each of the drivers provide at least one channel for communication between the network interface device and the data processing system.

5. The network interface device of claim 4 wherein the at least one data channel is one of:
   a data channel for the transfer of traffic data between the network interface device and the data processing system; and
   a control channel for the transfer of control data between the network interface device and the data processing system.

6. A network interface device as claimed in claim 5, wherein at least one of the data channels is operable according to a network device identification specification (NDIS) interface.

7. A network interface device as claimed in claim 5, wherein the control channel is operable according to the windows device model (WDM).

8. A network interface device as claimed in claim 5, wherein the network interface device is capable of supporting a communication link with another network interface device and of transmitting over the communication link application-level data received over one the at least one data channels.

9. A network interface device as claimed in claim 5, wherein the network interface device is configured to transmit and/or receive data over a data channel in the form of data packets.

10. A network interface device as claimed in claim 5, wherein the network interface device is configured to transmit and/or receive data over a data channel in the form of internet protocol packets.

11. A network interface device as claimed in claim 5, wherein each channel is configured to be triggered by means of a single interrupt.

12. A network interface device as claimed in claim 11, wherein said at least one processor and at least one memory are configured to trigger said interrupt if a respective event queue includes event messages.

13. A network interface device as claimed in claim 11, wherein said at least one processor and at least one memory are configured to trigger said interrupt if a respective queue includes more than a predetermined number of event messages.

14. A network interface device as claimed in claim 11, wherein said at least one processor and at least one memory are configured to trigger said interrupt if an event message has been included in a respective event queue for longer than a predetermined period of time.

15. A network interface device as claimed in claim 11, wherein the said at least one processor and at least one memory are configured to trigger said interrupt if longer than a predetermined period of time has elapsed since a respective event queue was empty of messages.

16. A network interface device as claimed in claim 5, wherein said at least one processor and at least one memory are configured on deactivation of a control channel, to signal the or each data channel with a message indicative of deactivation of the control channel.

17. A method for transferring data comprising:
- transferring data from a network interface device to a first driver of a data processing device supporting an operating system and at least one application, said first driver having a first event queue; and
- transferring data between the network interface device and a second driver of the data processing device, said second driver having a second event queue, wherein said transferring data comprises:
  - individually addressing respective data to each driver independently and directly by placing an event data block on the event queue associated with the respective driver being addressed;
  - determining if the event data block is of a first type or a second type;
  - if the event data block is of the first type, place an event data block on the event queue associated with the first driver;
  - if the event data block is of the second type, place an event data block on the event queue associated with the second driver; and
  - subsequently requesting execution of the respective driver by raising an interrupt.

* * * * *

UNITED STATES PATENT AND TRADEMARK OFFICE
CERTIFICATE OF CORRECTION

| | | |
|---|---|---|
| PATENT NO. | : 9,690,724 B2 | Page 1 of 1 |
| APPLICATION NO. | : 14/489417 | |
| DATED | : June 27, 2017 | |
| INVENTOR(S) | : Steve Leslie Pope et al. | |

It is certified that error appears in the above-identified patent and that said Letters Patent is hereby corrected as shown below:

On the Title Page

Item (30), insert:
--Mar. 2, 2004  (GB) ........................ 0404696.7--

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*